(12) United States Patent
Ho

(10) Patent No.: US 11,431,597 B1
(45) Date of Patent: Aug. 30, 2022

(54) SYSTEMS AND METHODS FOR MOBILITY AWARE MULTIACCESS EDGE COMPUTING DEVICE SELECTION AND RELOCATION

(71) Applicant: Verizon Patent and Licensing Inc., Basking Ridge, NJ (US)

(72) Inventor: Joseph Ho, Sunnyvale, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 13 days.

(21) Appl. No.: 17/187,113

(22) Filed: Feb. 26, 2021

(51) Int. Cl.
| | |
|---|---|
| *H04L 43/0852* | (2022.01) |
| *H04W 36/26* | (2009.01) |
| *H04W 36/30* | (2009.01) |
| *H04W 24/02* | (2009.01) |
| *H04W 88/18* | (2009.01) |

(52) U.S. Cl.
CPC ......... *H04L 43/0852* (2013.01); *H04W 24/02* (2013.01); *H04W 36/26* (2013.01); *H04W 36/30* (2013.01); *H04W 88/18* (2013.01)

(58) Field of Classification Search
CPC .. H04L 43/0852; H04W 24/02; H04W 36/30; H04W 36/32; H04W 88/18; H04W 40/02; H04W 40/026; H04W 40/12
See application file for complete search history.

(56) References Cited

U.S. PATENT DOCUMENTS

| | | | |
|---|---|---|---|
| 2006/0176813 A1* | 8/2006 | Santhanankrishnan | ..................... H04L 47/801 370/395.21 |
| 2019/0254108 A1* | 8/2019 | Iwai | ....................... H04W 76/27 |

\* cited by examiner

*Primary Examiner* — Mohamed A Kamara

(57) ABSTRACT

A user equipment may determine a latency requirement of the user equipment, and may determine a first set of latencies between the user equipment and a first multi-access edge computing (MEC) device. The user equipment may determine a second set of latencies between the user equipment and a second MEC device, and may calculate a first violation probability based on the latency requirement and the first set of latencies. The user equipment may calculate a second violation probability based on the latency requirement and the second set of latencies, and may identify the first MEC device or the second MEC device based on the first violation probability and the second violation probability. The user equipment may selectively initiate a MEC handoff of the user equipment to the first MEC device or the second MEC device based on identifying the first MEC device or the second MEC device.

20 Claims, 11 Drawing Sheets

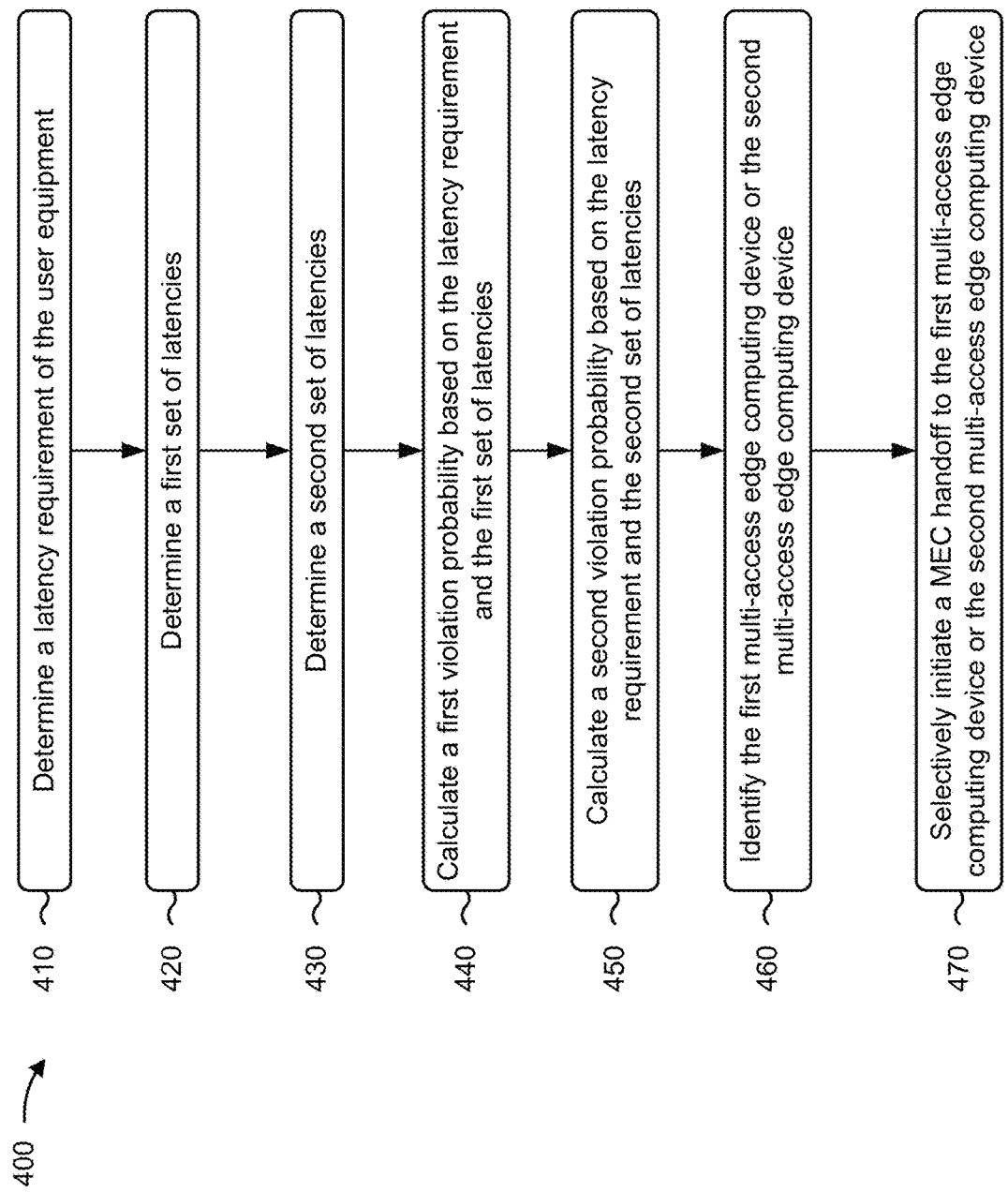

SYSTEMS AND METHODS FOR MOBILITY AWARE MULTIACCESS EDGE COMPUTING DEVICE SELECTION AND RELOCATION

BACKGROUND

Multi-access edge computing (MEC) is a technology that provides computing resources at an edge of a network. A MEC device may support computing requirements of user equipment (UEs) that are within an area of service of the MEC device.

BRIEF DESCRIPTION OF THE DRAWINGS

FIG. 4 is a flowchart of an example process for providing mobility aware MEC device selection and relocation.

DETAILED DESCRIPTION OF PREFERRED EMBODIMENTS

Figure 1A:
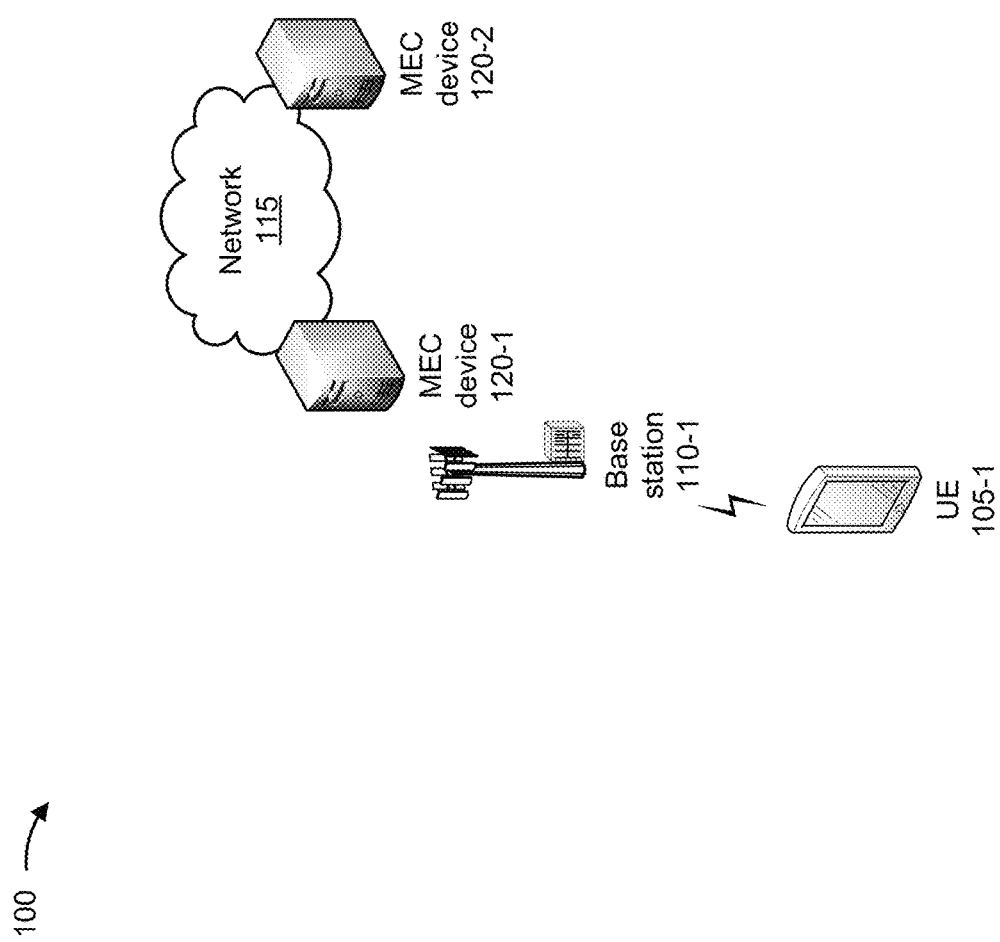
FIGS. 1A-1H are diagrams of an example associated with providing mobility-aware MEC device selection and relocation.

The following detailed description of example implementations refers to the accompanying drawings. The same reference numbers in different drawings may identify the same or similar elements.

Unlike cloud computing where computing resources are provisioned at remote data centers, MEC devices are provisioned within a network such as a cellular network. Accordingly, a measure of latency between a MEC device and a UE may be lower than a measure of latency between a cloud computing resource and the UE. Low latency may be required for certain applications of the UE, such as augmented reality applications, virtual reality applications, vehicle control applications, machine control applications, among other examples. MEC devices may, therefore, be more suitable to provide computing resources for such applications.

MEC devices may be provisioned at different point and at multiple locations within a cellular network, such as within a core network, a radio access network (RAN), a base station, among other examples. Accordingly, the UE may have access to multiple MEC devices provisioned within the cellular network. However, latency may differ from one MEC device to another MEC device. For example, a measure of latency between the UE and a MEC device (e.g., provisioned at a serving base station of the UE) may be lower than a measure of latency between the UE and another MEC device (e.g., provisioned at another base station or at another location within the cellular network). A particular MEC device (e.g., an optimal MEC device) may be selected to support computing requirements of an application of the UE (e.g., on a per-UE and per-cell basis) based on a latency requirement of the application and other factors, such as processing load and transmission bandwidth. For example, the particular MEC device may be selected because the particular MEC may be capable of meeting the latency requirement and may have sufficient computing resources to perform computations required by the application.

In some instances, a new MEC device may be selected for the UE as the UE moves from a serving cell to a new cell (e.g., of the serving base station) or from the serving base station to a new base station. The new MEC device may be selected because the particular MEC device may no longer be capable of meeting the latency requirement of the application due to the UE moving away from the particular MEC device (e.g., by moving to the new cell or the new base station) Thus, the new MEC device may be selected (e.g., due to the UE having lower latency to the new MEC device) and the computations for the application (of the UE) may be relocated from the particular MEC device to the new MEC device.

Current MEC relocation procedures (e.g., for relocating the computations for the application from one MEC device to another MEC device) may require an undesirable amount of time as the procedures involve configuring of a new application instance (of the application) at the new MEC device and relocating data associated with the computations for the application from the particular MEC device to the new MEC device. The data may include state information (e.g., if the application is not a stateless application) and other data associated with executing the application. Therefore, mobility of the UE may complicate MEC device selection and MEC relocation procedures for relocating the computations for the application (which may be referred to as a MEC handoff).

Current MEC relocation procedures may not be optimal (e.g., with respect to the performance of the application) and/or may cause a temporary loss of services by the UE (e.g., loss of services provided by the application and/or loss of network services). Such degradation and temporary loss of services may significantly impact a user experience.

Some implementations described herein provide a method and device that take into consideration mobility of the UE when MEC device selection and MEC relocation procedures are performed. For example, a device (e.g., a UE, a MEC device, or another network device) may determine a latency requirement of the UE. In some instances, the latency requirement may be associated with computing resources that are used to support an application being executed by the UE. The device may determine a first set of latencies between the UE and a first MEC device (e.g., based on information regarding the first MEC device). The first set of latencies may include a latency between a serving cell of the UE and the first MEC device and a latency between each neighbor cell (of the serving cell) and the first MEC device. Latency values (of the first set of latencies) may be different as each cell may have a different communication path to the first MEC device. The device may determine a second set of latencies between the UE and a second MEC device (e.g., based on information regarding the second MEC device). The second set of latencies may include a latency between the serving cell of the UE and the second MEC device and a latency between each neighbor cell (of the serving cell) and the second MEC device.

The device may calculate a first violation probability based on the latency requirement and the first set of latencies. A violation probability may refer to a probability that a MEC device 120 will not be able to meet the latency requirement if UE 105-1 moves from a serving cell to a neighbor cell (e.g., via one cell handoff, two cell handoff, and so on). For example, the device may determine the probability of a latency violation occurring with respect to the first MEC device. The latency violation may occur when a movement of the UE (e.g., to a new cell or to a new base station) causes the first MEC device to no longer comply with the latency requirement of the application. The device may calculate a second violation probability based on the latency requirement and the second set of latencies (e.g., in a similar manner). The device may identify (or select) the first MEC device or the second MEC device based on the first violation probability and the second violation probability (e.g., the device may perform a MEC device selection procedure).

Assuming the UE is currently served by the first MEC device, the device may selectively decide that the UE is to continue to use the first MEC device or initiate a MEC handoff to the second MEC device based on identifying (or selecting) the first MEC device or the second MEC device. In some examples, the UE may perform a MEC proactive handoff or a MEC pre-handoff, as explained below. By taking into consideration the mobility of the UE, the UE may minimize degradation and loss of services when the UE moves to a new cell and when MEC device selection and MEC relocation procedures are performed. Thus, by optimizing MEC selection and relocation procedures, the device may preserve service quality after a movement.

FIGS. 1A-1H are diagrams of an example 100 associated with providing mobility-aware MEC device selection and relocation. As shown in FIGS. 1A-1H, example 100 includes a UE 105-1 associated with a base station 110-1, a network 115, and MEC devices 120. UE 105-1 may include a wireless communication device, a mobile phone, a laptop computer, a tablet computer, an Internet of Things (IoT) device, among other examples. Base station 110-1 may include an eNodeB (eNB), a gNodeB (gNB), among other examples. Network 115 may include a radio access network (RAN) or a core network associated with a long-term evolution (LTE) or fourth generation (4G) network, a new radio (NR) or fifth generation (5G) network, among other examples. Each MEC device 120 may include one or more devices that are able to perform computations (e.g., processing tasks) for applications executing on UE 105-1. In some examples, a MEC device 120 (e.g., MEC device 120-1) may be provisioned at base station 110-1.

In the example that follows, assume, as shown FIG. 1A, that UE 105-1 is connected to base station 110-1 (e.g., a serving base station for UE 105-1) and that UE 105-1 is receiving data and transmitting data via a cell (e.g., a serving cell) of base station 110-1. Further assume that UE 105-1 has initiated execution of an application (e.g., a virtual reality application) that is associated with low latency. Further assume that MEC device 120-1 and MEC device 120-2 have sufficient computing resources to support the application (e.g., sufficient computing resources to perform computations associated with the application). Further assume that UE 105-1 is able to connect with MEC device 120-1 or MEC device 120-2 (e.g., based on a location of UE 105-1) for the purpose of performing computations associated with the application.

Figure 1B:
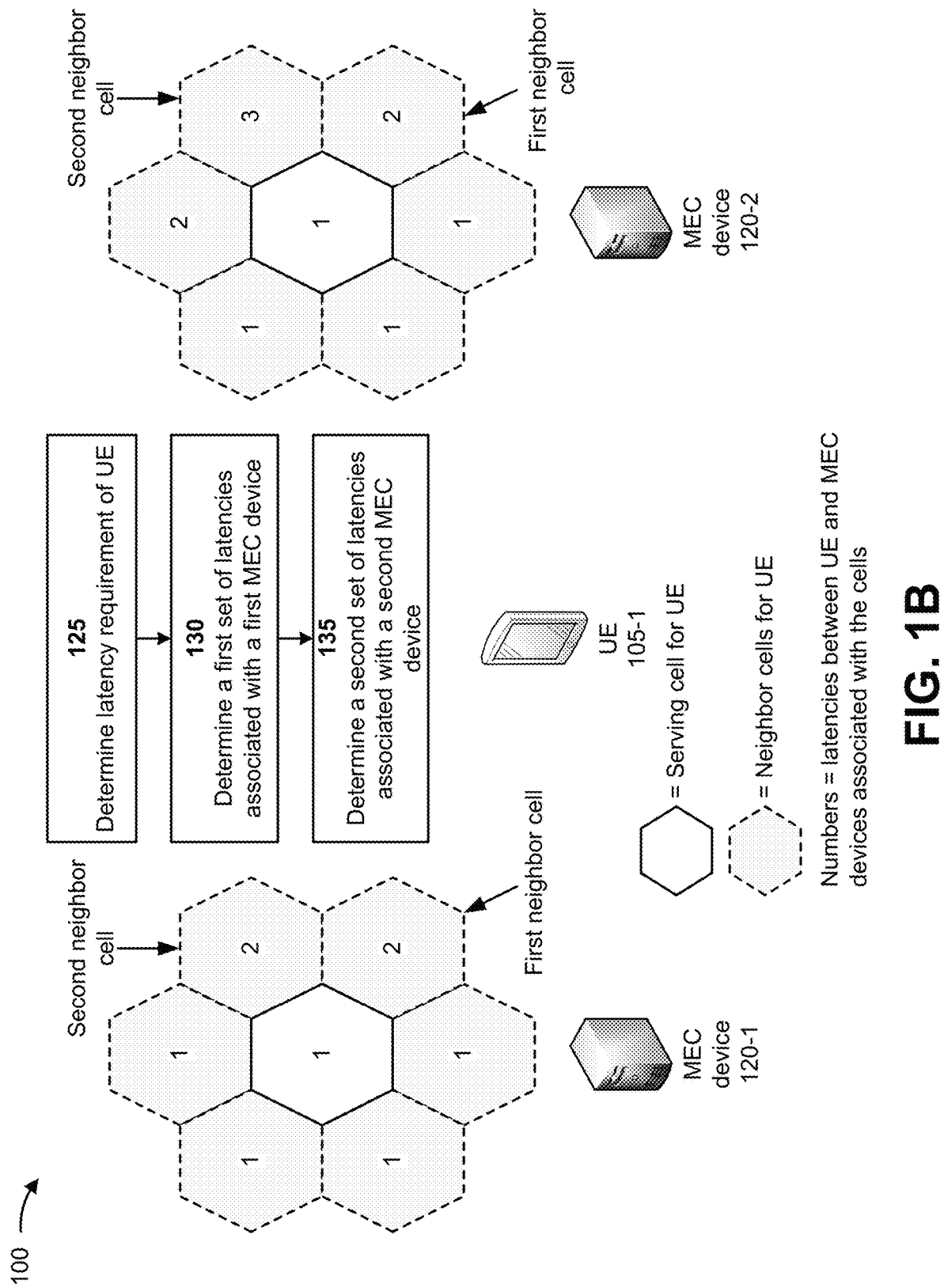

As shown in FIG. 1B, and by reference number 125, an orchestration device may determine a latency requirement of UE 105-1. The orchestration device may include a UE (e.g., UE 105-1), a MEC device 120 (e.g., MEC device 120-1, MEC device 120-2, among other examples), another device associated with network 115, among other examples. In some implementations, based on initiating execution of the application that is associated with low latency, the orchestration device may determine the latency requirement of the application executing on UE 105-1. In some implementations, the orchestration device may determine the latency requirement based on application data (of the application) stored in a memory of UE 105-1. In some examples, the latency requirement may be associated with computing resources to be used to support the application being executed by UE 105-1. In some examples, the latency requirement may be associated with the real-time response requirement of the application being executed by UE 105-1 such as the motion-to-photon duration of a virtual reality application. For example, the latency requirement may indicate a latency (associated with transmission of data and computations to be performed) that may prevent degradation (e.g., with respect to a performance of the application) and/or temporary loss of services by UE 105-1 (e.g., loss of services associated with the application).

The latency requirement may identify a latency range defined by a lower latency value and/or an upper latency value (e.g., where the latency range is greater than or equal to the lower latency value and less than the upper latency value). For example, the latency requirement may have a lower latency value of zero (0) and/or an upper latency value of about 2 milliseconds (ms). The above latency range is merely provided as an example. Other latency ranges may be used in some situations. In some examples, the latency ranges may vary based on a type of application, a type of computations, a configuration and a capability of UE 105-1, among other examples. In some implementations, the orchestration device may determine that the application is associated with low latency based on a type of the application, based on the latency requirement, based on requests made by the application, among other examples. As an example, with respect to the latency requirement, the orchestration device may compare the latency requirement and a threshold latency and may determine that the application is an application with low latency when the latency requirement does not meet the threshold latency.

As shown in FIG. 1B, and by reference number 130, the orchestration device may determine a first set of latencies associated with a first MEC device (e.g., MEC device 120-1). The first set of latencies may include a latency between the serving cell and MEC device 120-1 and a latency between each neighbor cell (of the serving cell) and MEC device 120-1. Latency values (of the first set of latencies) may be different as each cell may have a different communication path to MEC device 120-1. In some implementations, the orchestration device may identify (or select) one or more MEC devices 120 with sufficient computing resources and latency performance to offload (e.g., support) part of the computations required by the application being executed by UE 105-1. In some examples, the orchestration device may provide a MEC request to one or more network devices (e.g., base station 110-1) of network 115 to identify the one or more MEC devices 120 capable to support the computation and latency required by the application. In some implementations, the MEC request may include MEC request information. The MEC request information may include information identifying a type of the application, information identifying a quantity of computing resources (e.g., a processing, an operating system, a memory, and/or a storage need of UE 105-1 for executing the application), information identifying a type of computing resources (e.g., one or more central processing units (CPUs), one or more graphics processing units (GPUs), one or more quantum processing units (QPUs), among other examples), information identifying the latency requirement, information identifying a location of UE 105-1, among other examples.

In some implementations, based on providing the MEC request, the orchestration device may receive (e.g., from the one or more network devices) information identifying the one or more MEC devices 120 (e.g., information identifying MEC device 120-1 and information identifying MEC 120-2). As explained above, MEC device 120-1 and MEC device 120-2 may have sufficient computing resources to support the application (e.g., sufficient computing resources to perform computations associated with the application) and may be able to satisfy the latency requirement at a current location of UE 105-1 (e.g., with respect to the serving cell). Additionally, or alternatively, to receiving the information identifying the one or more MEC devices 120, the orchestration device may receive (e.g., from the one or more network devices) information identifying a plurality of MEC devices 120 provisioned in network 115. The orchestration device may obtain the information identifying MEC device 120-1 and the information identifying MEC 120-2, from the information identifying the plurality of MEC devices 120, based on the MEC request information (e.g., by filtering the information identifying the plurality of MEC devices 120 using the MEC request information). Based on receiving or obtaining the information identifying MEC device 120-1, the orchestration device may provide a MEC latency request (e.g., to the one or more network devices) to determine latencies between UE 105-1 and MEC device 120-1 when UE 105-1 is located in different cells of network 115 (e.g., neighbor cells of the serving cell).

In some implementations, the MEC latency request may include information identifying the serving cell for UE 105-1, information regarding the neighbor cells (e.g., information identifying a quantity of neighbor cells, information identifying the location of UE 105-1, information identifying an area associated with a threshold distance from the location of UE 105-1, information identifying a projected location of UE 105-1, information identifying a route to the projected location of UE 105-1 (e.g., a travel trajectory of UE 105-1), sensor data (e.g., from one or more sensor devices of UE 105-1) indicating a speed and a direction of travel of UE 105-1, among other examples), the information identifying MEC device 120-1, among other examples. In some examples, the information identifying the projected location of UE 105-1 and/or the information identifying the route may obtained from a navigation application of UE 105-1 (e.g., executing concurrently with the application) and/or obtained based on analyzing historical data (e.g., historical location data and/or historical route data).

The one or more network devices may identify the neighbor cells based on the information identifying the serving cell and/or the information regarding the neighbor cells. The neighbor cells may correspond to cells associated with the area (associated with the threshold distance), cells associated with the projected location (e.g., cells within a threshold distance of the projected location), cells associated with the route (e.g., cells along the route), among other examples. As an example, the neighbor cells may include one or more other cells of base station 110-1 and/or one or more cells of another base station 110-1.

The one or more network devices may determine a plurality of latencies (e.g., latencies associated with data transmission) between UE 105-1 and MEC device 120-1 based on UE 105-1 being located in the different cells of network 115 (e.g., the serving cell and the neighbor cells). For example, the one or more network devices may determine a first latency between UE 105-1 and MEC device 120-1 when UE 105-1 is located in the serving cell, a second latency between UE 105-1 and MEC device 120-1 when UE 105-1 is located in a first neighbor cell, a third latency between UE 105-1 and MEC device 120-1 when UE 105-1 is located in a second neighbor cell, and so on. In some examples, a latency between UE 105-1 and MEC device 120-1 may be estimated by a sum of a measured latency between a cell and MEC device 120-1 and an estimated latency between UE 105-1 and the cell. In some implementations, the one or more network devices may determine the plurality of latencies based on data (e.g., current data and historical data) regarding latencies (associated with data transmission) between MEC device 120-1 and different UEs 105 located in the different cells of network 115.

The one or more network devices may provide information identifying the plurality of latencies to the orchestration device. The plurality of latencies may correspond to the first set of latencies associated with MEC device 120-1. The orchestration device may determine the first set of latencies based on the information identifying the plurality of latencies. As shown in FIG. 1B, the orchestration device may determine that the first latency (between UE 105-1 and MEC device 120-1 when UE 105-1 is located in the serving cell) is 1 ms, the second latency (between UE 105-1 and MEC device 120-1 when UE 105-1 is located in the first neighbor cell) is 2 ms, the third latency (between UE 105-1 and MEC device 120-1 when UE 105-1 is located in the second neighbor cell) is 2 ms, and so on. The latency values and the quantity of neighbor cells are merely provided as examples. Other latency values and quantities of neighbor cells may be used in some situations.

In some implementations, the information identifying MEC device 120-1 (received based on the MEC request) may include the information identifying the plurality of latencies (e.g., information identifying the first set of latencies). In such an instance, the orchestration device may not provide the MEC latency request. In some implementations, the information identifying MEC device 120-1 (received based on the MEC request) may include the data regarding the latencies between MEC device 120-1 and the different UEs 105. In such an instance, UE 105-1 may not provide the MEC latency request and may determine the first set of latencies associated with MEC device 120-1 based on the historical data. In some implementations, the orchestration device may obtain (e.g., from MEC device 120-1) information about the process load of MEC device 120-1. In some examples, the orchestration device may obtain the information periodically (e.g., every second, every thirty seconds, among other examples) or obtain such information in real-time. UE 105-1 may use the information to determine the first set of latencies.

As shown in FIG. 1B, and by reference number 135, the orchestration device may determine a second set of latencies associated with a second MEC device (e.g., MEC device 120-2). For example, the orchestration device may determine the second set of latencies in a manner similar to the manner described above with respect to the first set of latencies. As shown in FIG. 1B, the orchestration device may determine that a first latency (between UE 105-1 and MEC device 120-2 when UE 105-1 is located in the serving cell) is 1 ms, a second latency (between UE 105-1 and MEC device 120-2 when UE 105-1 is located in the first neighbor cell) is f2 ms, a third latency (between UE 105-1 and MEC device 120-2 when UE 105-1 is located in the second neighbor cell) is 3 ms, and so on. The latency values and the quantity of neighbor cells are merely provided as examples. Other latency values and quantities of neighbor cells may be used in some situations.

In some implementations, MEC device 120-1 may be a serving MEC device 120 for UE 105-1. For example, a connection may exist between MEC device 120-1 and UE 105-11 and/or MEC device 120-1 may be performing (or may have performed) computations for the application and/or another application executed by UE 105-1. Based on MEC device 120-1 being the serving MEC device 120, the orchestration device may provide a MEC request and/or a MEC latency request to MEC device 120-1 (in addition, or alternatively, to providing the MEC request and/or the MEC latency request to the one or more network devices). MEC device 120-1 may provide, to the orchestration device, the information identifying the plurality of latencies between UE 105-1 and MEC device 120-2, based on the MEC request and/or the MEC latency request. The orchestration device may determine the second set of latencies based on the information identifying the plurality of latencies between UE 105-1 and MEC device 120-2.

Figure 1C:
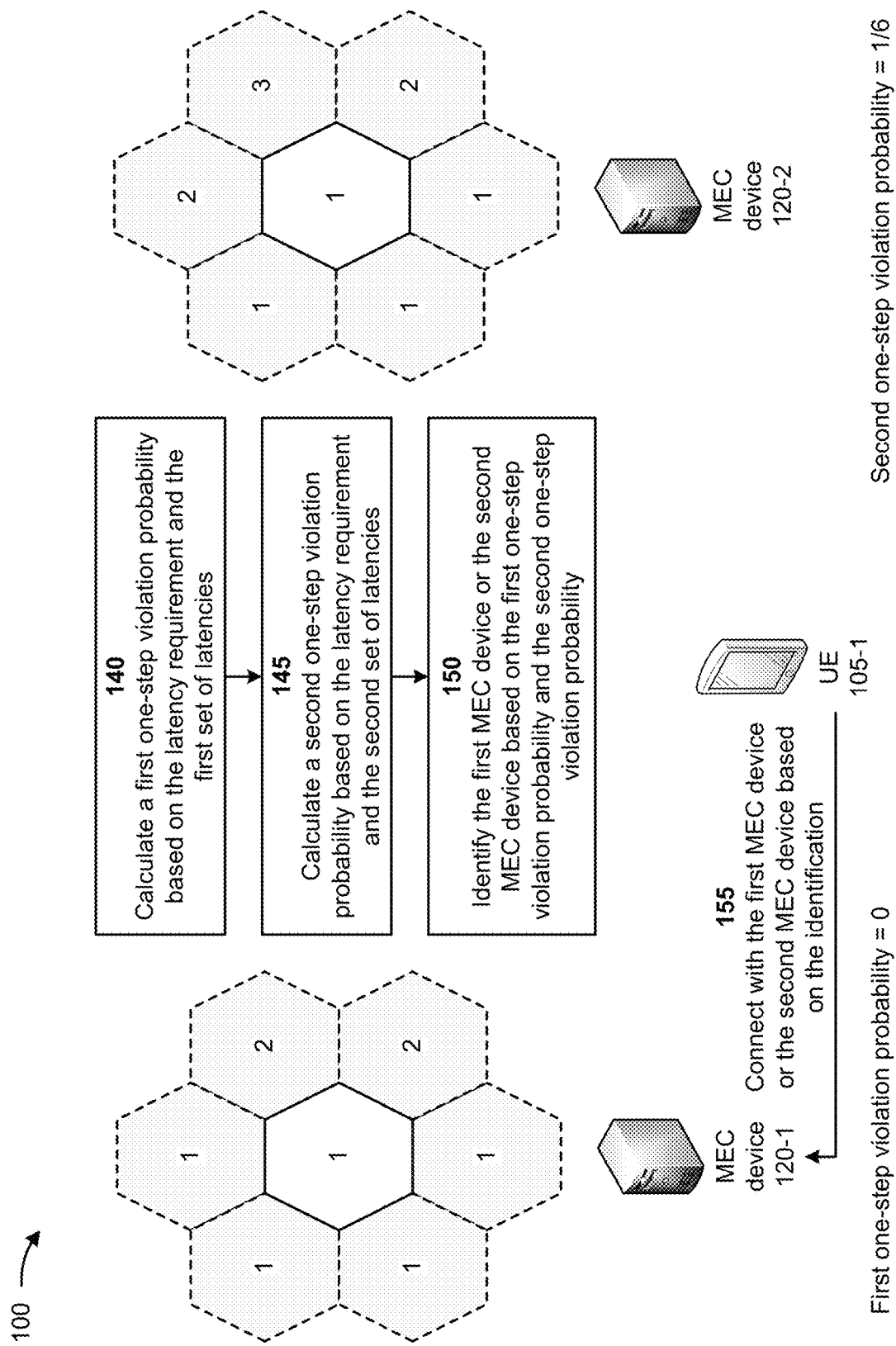

As shown in FIG. 1C, and by reference number 140, the orchestration device may calculate a first one-step violation probability, for each MEC device 120 that has sufficient computing resources to support the application, based on the latency requirement and the first set of latencies. A one-step violation probability may refer to a probability that a MEC device 120 will not be able to meet the latency requirement if UE 105-1 moves from the serving cell to one of the neighbor cells (e.g., via a one-step movement). A one-step movement may refer to UE 105-1 moving from the serving cell to a neighbor cell by crossing one cell boundary. More specifically, a one-step movement may refer to a movement from the serving cell to a neighbor cell after one cell handoff. The neighbor cell may be referred to as a one-step neighbor cell and the neighbor cells may collectively be referred to as one-step neighbor cells. In some implementations, k-step neighbor cells (where k≥1) may refer to neighbor cells to which UE 105-1 may move after a k cell boundary crossing (excluding cells to which UE 105-1 may move to after a k−1 (or less) cell boundary crossing).

A k-step (where k≥1) violation probability may refer to a probability that UE 105-1 will violate the latency requirement of an application if UE 105-1 is located at a k-step neighbor cell. In this instance, the first one-step violation probability may refer to a probability that the latency requirement will not be met by MEC device 120-1 (and, accordingly, UE 105-1 will not be able to meet the latency requirement) if UE 105-1 moves from the serving cell to a neighbor cell (e.g., a one-step neighbor cell). For example, the latency requirement will not be met by MEC device 120-1 if a latency (between UE 105-1 and MEC device 120-1 when UE 105-1 is located in the neighbor cell) exceeds the latency requirement of the application.

In some implementations, when calculating the first one-step violation probability, the orchestration device may compare the latency requirement and the first set of latencies to determine whether any latency (of the first set of latencies) exceeds the latency requirement. For example, the orchestration device may compare the latency requirement and a first latency of the first set of latencies, compare the latency requirement and a second latency of the first set of latencies, and so on. As shown in FIG. 1C, the first set of latencies does not include a latency that exceeds the latency requirement of 2 ms. For example, the first set of latencies does not include a latency that exceeds the latency requirement of 2 ms. Accordingly, the orchestration device may determine that the first one-step violation probability is zero with respect to MEC device 120-1. In other words, UE 105-1 may be determine that the latency requirement will be met by MEC device 120-1 (and, accordingly, UE 105-1 will be able to meet the latency requirement) if UE 105-1 moves from the serving cell to any neighbor cell (e.g., any one-step neighbor) associated with the first set of latencies.

In some implementations, the orchestration device may determine a movement probability of UE 105-1 moving from the serving cell to the neighbor cells based on the sensor data (indicating the speed and the direction of travel of UE 105-1) and/or navigation information. The navigation information may include the information identifying the projected location of UE 105-1 and the information identifying the route to the projected location of UE 105-1 (e.g., the travel trajectory of UE 105-1) which may be obtained from the navigation application of UE 105-1 (e.g., if the navigation application is executing concurrently with the application). Additionally, or alternatively, the navigation information may include location data (e.g., current and/or historical) and/or route data (e.g., current and/or historical).

In some examples, the orchestration device may determine that a movement probability of UE 105-1 moving from the serving cell to the first neighbor cell is less than a movement probability of UE 105-1 moving from the serving cell to the second neighbor cell for one or more reasons. The one or more reasons may include the fact that the second neighbor cell is included in the route or the direction of travel while the first neighbor cell is not included in the route or the direction of travel, the fact that the second neighbor cell is within a threshold distance along the route while the first neighbor cell is not within the threshold distance, the fact that the second neighbor cell is more frequently included in historical routes (from the historical route data) than the first neighbor cell, among other examples.

The above example may refer to equal movement probability (e.g., an equal probability of UE 105-1 moving from the serving cell to different neighbor cells). In some implementations, the orchestration device may determine unequal movement probabilities (e.g., a different (or unequal) probability of UE 105-1 moving from the serving cell to different neighbor cells). When calculating a violation probability under unequal movement probabilities, the orchestration device may use the movement probability as a weighting factor. As an example, assume for three neighbor cells, A, B and C, a probability of UE 105-1 moving to cell A is 0.7, a probability of UE 105-1 moving to cell B is 0.2, and a probability of UE 105-1 moving to cell C is 0.1. The movement probabilities may be determined based on the sensor data (indicating the speed and the direction of travel of UE 105-1) and/or the navigation information described above. Assume that a movement to cell A will not result in a latency violation and that a movement to cells B and C will result in a latency violation. In this case, the violation probability given knowledge of the movement probability is (0.2+0.1)/(0.7+0.2+0.1)=0.3. Although 2 out of 3 neighbor cells will result in latency violation, the violation probability is only 0.3 due to a lower chance of UE 105-1 moving to cells that will result in a latency violation. In the prior example (in which the movement probabilities are equal), the violation probability would be ⅔ because two of the three neighbor cell will result in a latency violation.

As shown in FIG. 1C, and by reference number 145, the orchestration device may calculate a second one-step violation probability based on the latency requirement and the second set of latencies. In some implementations, the orchestration device may determine the second one-step violation probability in a manner similar to the manner described above with respect to the first one-step violation probability. In this instance, the second one-step violation probability may refer to a probability that the latency requirement will not be met by MEC device 120-2 (and, accordingly, UE 105-1 will not be able to meet the latency requirement) if UE 105-1 moves from the serving cell to a two-step neighbor cell after two cell handoffs.

As shown in FIG. 1C, the second set of latencies includes a latency that exceeds the latency requirement. For example, the second set of latencies includes a latency of t3 ms, which exceeds the latency requirement of 2 ms. Because the second set of latencies identifies 6 neighbor cells and one latency exceeds the latency requirement of 2 ms, the orchestration device may determine that the second one-step violation probability is 0.167 (or one sixth). In other words, the orchestration device may determine a 0.167 probability that the latency requirement will not be met by MEC device 120-2 (and, accordingly, UE 105-1 will not be able to meet the latency requirement) if UE 105-1 moves from the serving cell to a neighbor cell.

As shown in FIG. 1C, and by reference number 150, the orchestration device may identify the first MEC device or the second MEC device based on the first one-step violation probability and the second one-step violation probability. For example, the orchestration device may identify (or select) which MEC device 120 (out of MEC device 120-1 and MEC device 120-2) to connect with in order to minimize degradation and loss of services (e.g., associated with the application) when UE 105-1 moves from the serving cell to a neighbor cell. The process of identifying (or selecting) a MEC device 120 (for UE 105-1 to connect with) may be referred to as a MEC selection procedure. In some implementations, the orchestration device may identify (or select) a MEC device 120 (out of MEC device 120-1 and MEC device 120-2) associated with a lowest one-step violation probability out of the first one-step violation probability and the second one-step violation probability.

For example, the orchestration device may compare the first one-step violation probability and the second one-step violation probability. Based on the comparison, the orchestration device may determine that the first one-step violation probability (e.g., 0) is less than the second one-step violation probability 0.167). The orchestration device may identify (or select) MEC device 120-1 based on determining that the first one-step violation probability is less than the second one-step violation probability.

In some implementations, if the orchestration device determines that the first one-step violation probability and the second one-step violation probability are equivalent, the orchestration device may identify (or select) MEC device 120-1 or MEC device 120-2 based on one or more other factors. For example, the orchestration device may identify (or select) MEC device 120-1 or MEC device 120-2 based on which one (out of MEC device 120-1 or MEC device 120-2) is currently the serving MEC device 120 (e.g., identify the one that is currently the serving MEC device 120), based on which one (out of MEC device 120-1 or MEC device 120-2) was previously the serving MEC device 120 (e.g., identify the one that was previously the serving MEC device 120), based on which one (out of MEC device 120-1 or MEC device 120-2) is included in or is within a threshold distance of the route (to the projected location) or the direction of travel, based on which one (out of MEC device 120-1 or MEC device 120-2) is included in or is within a threshold distance of the historical routes, based on which one (out of MEC device 120-1 or MEC device 120-2) is associated with a lowest two-step violation probability, among other examples. A two-step violation probability may refer to a probability that a MEC device 120 will not be able to meet the latency requirement if UE 105-1 moves from the serving cell to a two-step neighbor cell (e.g., via a two-step movement). A two-step movement may refer to UE 105-1 moving from the serving cell to the two-step neighbor cell by crossing two cell boundaries.

As shown in FIG. 1C, and by reference number 155, UE 105-1 may connect with the first MEC device or the second MEC device based on the identification. For example, based on identifying (or selecting) MEC device 120-1 (e.g., due to the first one-step violation probability being less than the second one-step violation probability), the orchestration device may cause UE 105-1 to connect with MEC device 120-1. UE 105-1 may connect with MEC device 120-1 to minimize one-step violation probabilities and, thereby, minimize degradation and loss of services when UE 105-1 moves to a neighbor cell. By connecting with MEC device 120-1 (e.g., a MEC device 120 associated with a lowest one-step violation probability), the orchestration device may preserve service quality after a movement of UE 105-1. Additionally, or alternatively, the orchestration device may preserve computing resources, networking resources, and other resources that would have otherwise been consumed by configuring UE 105-1 to prevent degradation and/or temporary loss of services, configuring MEC devices 120 to prevent degradation and/or temporary loss of services, configuring network 115 to prevent degradation and/or temporary loss of services, among other examples.

Assume that, prior to connecting with MEC device 120-1, UE 105-1 was connected to a serving MEC device 120. UE 105-1 may determine to disconnect from the serving MEC device 120 and connect with another MEC device 120 (e.g., MEC device 120-1) for one or more reasons. For example, the orchestration device may determine that UE 105-1 is to be disconnect from the serving MEC device 120 based on the orchestration device determining that the serving MEC device 120 is no longer be able to meet the latency requirement of 2 ms, based on predicting that the serving MEC device 120 will not be able to meet the latency requirement (e.g., based on the sensor data identifying the speed and the direction of travel of UE 105-1), based on comparing a violation probability of the serving MEC device 120 and a violation probability of one or more MEC devices 120 (that have sufficient computing resources to support the application), among other examples. The process of disconnecting from the serving MEC device 120 and connecting with another MEC device 120 may be referred to as a MEC handoff. As part of UE 105-1 performing the MEC handoff to MEC device 120-1, the orchestration device may provide information regarding the application (e.g., application data) to MEC device 120-1 to enable MEC device 120-1 to perform the computations associated with executing the application.

In some examples, the orchestration device may perform a MEC hard handoff. The MEC hard handoff may refer to a MEC handoff that is performed when a movement of UE 105-1 results in a latency violation with the serving MEC 120. For example, the movement may result in the serving MEC 120 being unable to meet the latency requirement. In such an instance, the orchestration device may select a new MEC device 120 (e.g., MEC device 120-1) using the MEC selection procedure (as explained above) and perform a MEC handoff to MEC device 120-1. The MEC hard handoff may result in a temporary latency violation (as explained above) until information regarding the application is provided to MEC device 120-1 to enable MEC device 120-1 to perform the computations associated with executing the application.

In some examples, to eliminate the temporary latency violation association with a MEC hard handoff, the orchestration device may perform a MEC proactive handoff. The MEC proactive handoff may refer to a MEC handoff that is performed after a movement of UE 105-1 that does not result in a latency violation. For example, after the movement, the serving MEC device 120 may still be able to meet the latency requirement. In this instance, even though the movement did not result in a latency violation, the movement may increase a probability of a latency violation (e.g., increase a one-step violation probability) by the serving MEC device 120 with respect to a subsequent movement of UE 105-1.

In order to decrease the probability of a latency violation for the subsequent movement, the orchestration device may identify (or select) a MEC device 120 using the MEC selection procedure after the movement. For example, after the movement, UE 105-1 may identify (or select) MEC device 120-1 as a MEC device 120 associated with a lowest one-step violation probability out of all MEC devices 120 that can meet the latency requirement of the application and have sufficient computing resources to support the application. While the example described herein refers to one-step violation probabilities, the example may be applicable to k-step violation probabilities (e.g., where k≥1). After identifying MEC device 120-1, the orchestration device may perform a MEC handoff to MEC device 120-1. The objective of the MEC proactive handoff is to enable UE 105-1 to switch from the serving MEC device 120 to a more optimal MEC device 120 in order to minimize the probability of a latency violation after a subsequent movement of UE 105-1. The MEC proactive handoff may reduce the chance of occurrence of a MEC hard handoff and the degradation and loss of services caused by a MEC hard handoff.

In some examples, the orchestration device may perform a MEC pre-handoff to prepare a MEC device 120 (e.g., identified based on the MEC selection procedure) to support UE 105-1 prior to performing a MEC handoff. For instance, the orchestration device may perform the MEC pre-handoff to prepare MEC device 120-1 to perform the computations associated with the application. As an example, when performing the MEC pre-handoff for MEC device 120-1, the information regarding the application may be provided to MEC device 120-1 (e.g., as soon as MEC device 120-1 has been identified by UE 105-1 as explained above) in order to prepare MEC device 120-1 to support UE 105-1 (with respect to executing the application) as soon as possible after the next UE movement. The MEC pre-handoff may include causing one or more instances of the application to be initiated at MEC device 120-1 and include providing state data (e.g., associated with executing the application) to MEC device 120-1. The MEC pre-handoff may be performed (e.g., in conjunction with a MEC proactive handoff), when necessary after a movement of UE 105-1, to expedite subsequent MEC handoff and minimize any negative impact on user experience (that may be caused by the MEC handoff). The MEC pre-handoff may be useful when the serving MEC device has high latency violation probability after a movement of UE 105-1 to a neighbor cell but another MEC device 120 that can satisfy the latency requirement of the application and that has a low violation probability after the movement of UE 105-1 to the neighbor cell (identified for a MEC proactive handoff) is not available (e.g., within a threshold amount of time following a movement of UE 105-1).

While the foregoing example has been described with respect to UE 105-1 being connected to a serving MEC device 120, in some implementations, UE 105-1 may be initiating an application and may not be connected to a serving MEC 105-1 for the purpose of executing the application. In such an instance, the MEC selection procedure may be used to select a MEC device 120 and run the application via the selected MEC device 120. Accordingly, a MEC handoff will not be performed.

Figure 1D:
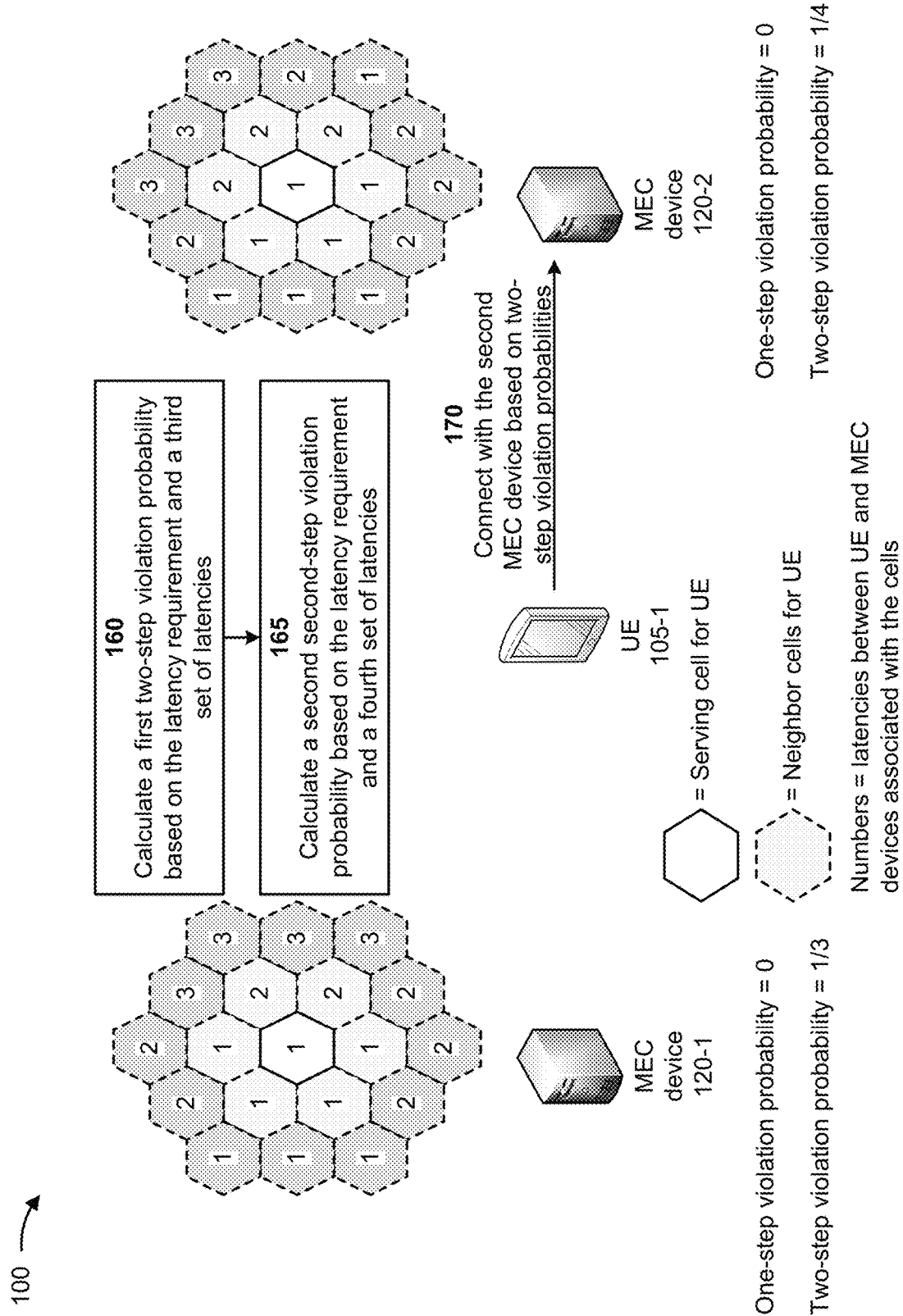

With respect to FIG. 1D, assume that the orchestration device determines that the first one-step violation probability (calculated for MEC device 120-1) is equivalent to the second one-step violation probability (calculated for MEC device 120-2).

As shown in FIG. 1D, and by reference number 160, the orchestration device may calculate a first two-step violation probability based on the latency requirement and a third set of latencies. For example, based on determining that the first one-step violation probability is equivalent to the second one-step violation probability, the orchestration device may identify two-step neighbor cells and determine a third set of latencies associated with MEC device 120-1 based on UE 105-1 being located in the two-step neighbor cells, in a manner similar to the manner described above with respect to calculating the first set of latencies. The orchestration device may calculate the first two-step violation probability based on the latency requirement and the third set of latencies in a manner similar to the manner described above with respect to calculating one-step violation probabilities.

As shown in FIG. 1D, the third set of latencies may identify latencies associated with twelve two-step neighbor cells and identify four two-step neighbor cells (out of the twelve two-step neighbor cells) with latencies that exceed the latency requirement of 2 ms. Accordingly, assuming an equal probability of UE 105-1 moving to any neighbor cell, the orchestration device may determine that the first two-step violation probability is 0.33 with respect to MEC device 120-1. In other words, the orchestration device may be determine a 0.33) probability that the latency requirement will not be met by MEC device 120-1 (and, accordingly, UE 105-1 will not be able to meet the latency requirement) if UE 105-1 moves from the serving cell to a two-step neighbor cell. The latency values and the quantity of neighbor cells are merely provided as examples. Other latency values and quantities of neighbor cells may be used in some situations. While the first two-step violation probability above refers to an equal probability that UE 105-1 will move to any neighbor cell, the first two-step violation probability may be determined based on unequal probabilities of UE 105-1 moving to different neighbor cells.

As shown in FIG. 1D, and by reference number 165, the orchestration device may calculate a second two-step violation probability based on the latency requirement and a fourth set of latencies. For example, based on determining that the first one-step violation probability is equivalent to the second one-step violation probability, the orchestration device may calculate a fourth set of latencies associated with MEC device 120-2 based on UE 105-1 being located in the two-step neighbor cells, in a manner similar to the manner described above. The orchestration device may calculate the second two-step violation probability based on the latency requirement and the fourth set of latencies in a manner similar to the manner described above.

As shown in FIG. 1D, the fourth set of latencies may identify latencies associated with the twelve two-step neighbor cells and identify three two-step neighbor cells (out of the twelve two-step neighbor cells) with latencies that exceed the latency requirement of 2 ms. Accordingly, the orchestration device may determine that the second two-step violation probability is 0.25 with respect to MEC device 120-2. The latency values and the quantity of neighbor cells are merely provided as examples. Other latency values and quantities of neighbor cells may be used in some situations.

As shown in FIG. 1D, and by reference number 170, UE 105-1 may connect with the second MEC device based on the two-step violation probabilities. For example, the orchestration device may compare the first two-step violation probability and the second two-step violation probability. Based on the comparison, the orchestration device may determine that the first two-step violation probability (e.g., 0.33) exceeds the second two-step violation probability (0.25. Accordingly, the orchestration device may identify (or select) MEC device 120-2 and perform a MEC handoff to MEC device 120-2 in a manner similar to the manner described above with respect to identifying MEC device 120-1 and performing a MEC handoff to MEC device 120-1. By identifying MEC device 120-2 and performing a MEC handoff to MEC device 120-2 in this manner, the orchestration device may preserve service quality after a movement of UE 105-1. Additionally, or alternatively, the orchestration device may conserve computing resources, networking resources, and other resources that would have otherwise been consumed by configuring UE 105-1 to prevent degradation and/or temporary loss of services, configuring MEC devices 120 to prevent degradation and/or temporary loss of services, configuring network 115 to prevent degradation and/or temporary loss of services, among other examples.

Figure 1E:
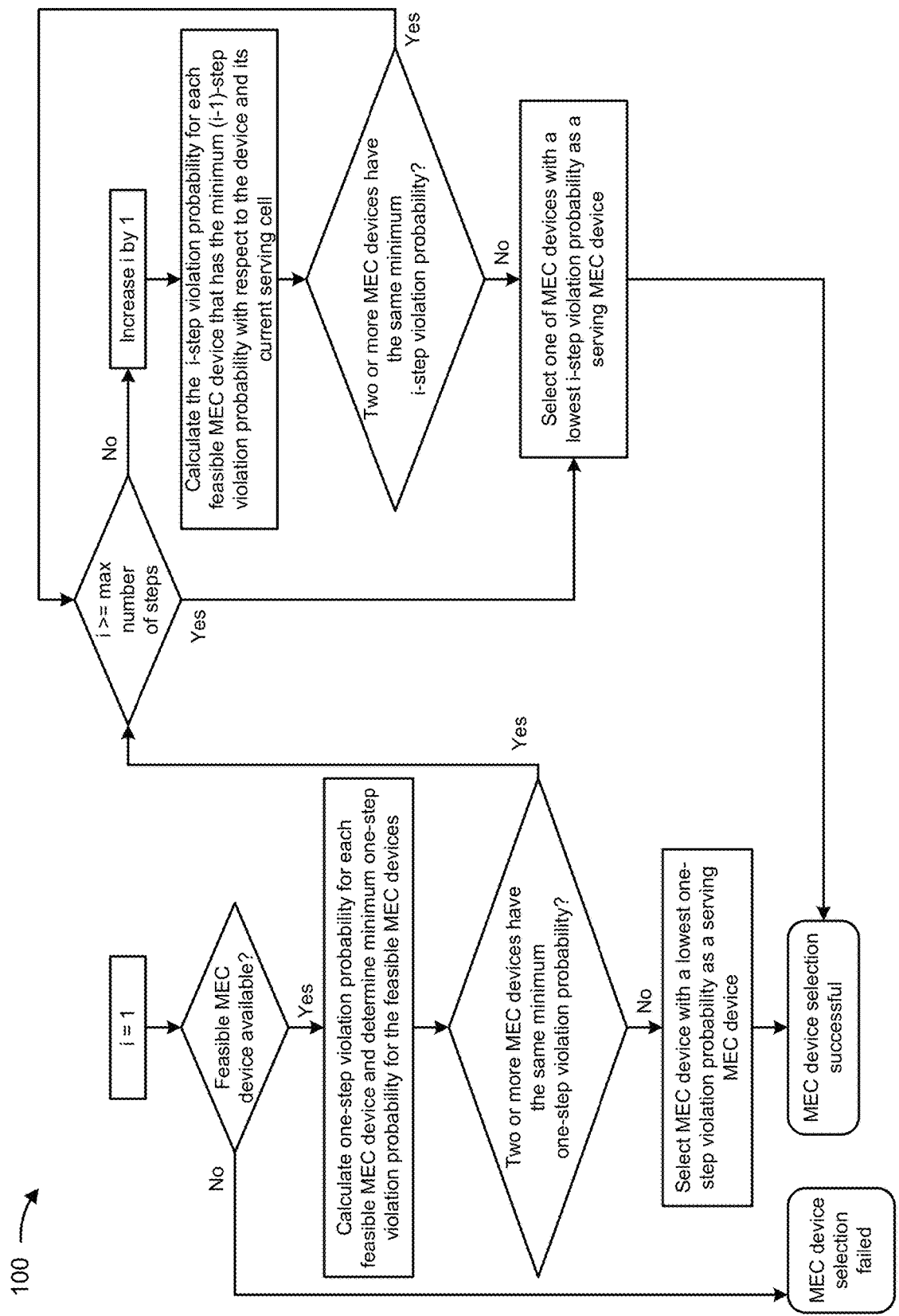

FIG. 1E is a flowchart of an example process for selecting a MEC device 120. In some implementations, the process of FIG. 1E may be performed by a device (e.g., the orchestration device). In some implementations, the process of FIG. 1E may be performed by another device or a group of devices separate from or including the device, such as a base station (e.g., base station 110) and/or a MEC device (MEC device 120). As shown in FIG. 1E, the process may include determining whether feasible MEC devices 120 are available. A feasible MEC device 120 is a MEC device 120 that is accessible to UE 105-1, that can meet a latency requirement of an application, and that has computing resources to perform computations (e.g., associated with executing the application). As shown in FIG. 1E, the process may include determining that the MEC selection procedure has failed when no feasible MEC device 120 is available.

As shown in FIG. 1E, if one or more feasible MEC devices 120 are available, the process may include calculating a one-step violation probability for each feasible MEC device 120 and determining a minimum one-step violation probability for the feasible MEC devices 120 (e.g., determining a feasible MEC device 120 with a lowest one-step violation probability). As shown in FIG. 1E, if two or more MEC devices do not have the same minimum one-step violation probability, the process may include selecting the feasible MEC device 120 with a lowest one-step violation probability as a serving MEC device 120. Alternatively, if two or more MEC devices have the same minimum one-step violation probability, the process may include determining whether the step (which is equal to 1 in this example since we are evaluating the one-step violation probability) of the violation probability equals or exceeds a maximum number of steps of the violation probability (e.g., determine whether i≥a maximum number of steps).

As shown in FIG. 1E, if the step of the violation probability does not equal or exceed the maximum number of steps of the violation probability, the process may include increasing the number of steps by 1 (e.g., in this example, increasing the one-step violation probability to a two-step violation probability) and calculate a two-step (i-step) violation probability for feasible MEC devices 120 with the same minimum one-step ((i−1)-step) violation probability with respect to the device (e.g., UE 105-1) and the current serving cell of the device (e.g., only feasible MEC devices 120 with the minimum violation probability in step i will be considered in step i+1). As shown in FIG. 1E, if two or more feasible MEC devices have the same minimum two-step violation probability, the process may be iterated for a three-step violation probability, a four-step step violation probability, and so on until the maximum number of steps has been performed. Otherwise, the process may include selecting one of the feasible MEC devices 120 with a lowest two-step violation probability as a serving MEC device 120.

Although FIG. 1E shows example blocks of a process for selecting a MEC device 120, in some implementations, the process of FIG. 1E may include additional blocks, fewer blocks, different blocks, or differently arranged blocks than those depicted in FIG. 1E. Additionally, or alternatively, two or more of the blocks of the process of FIG. 1E may be performed in parallel.

Figure 1F:
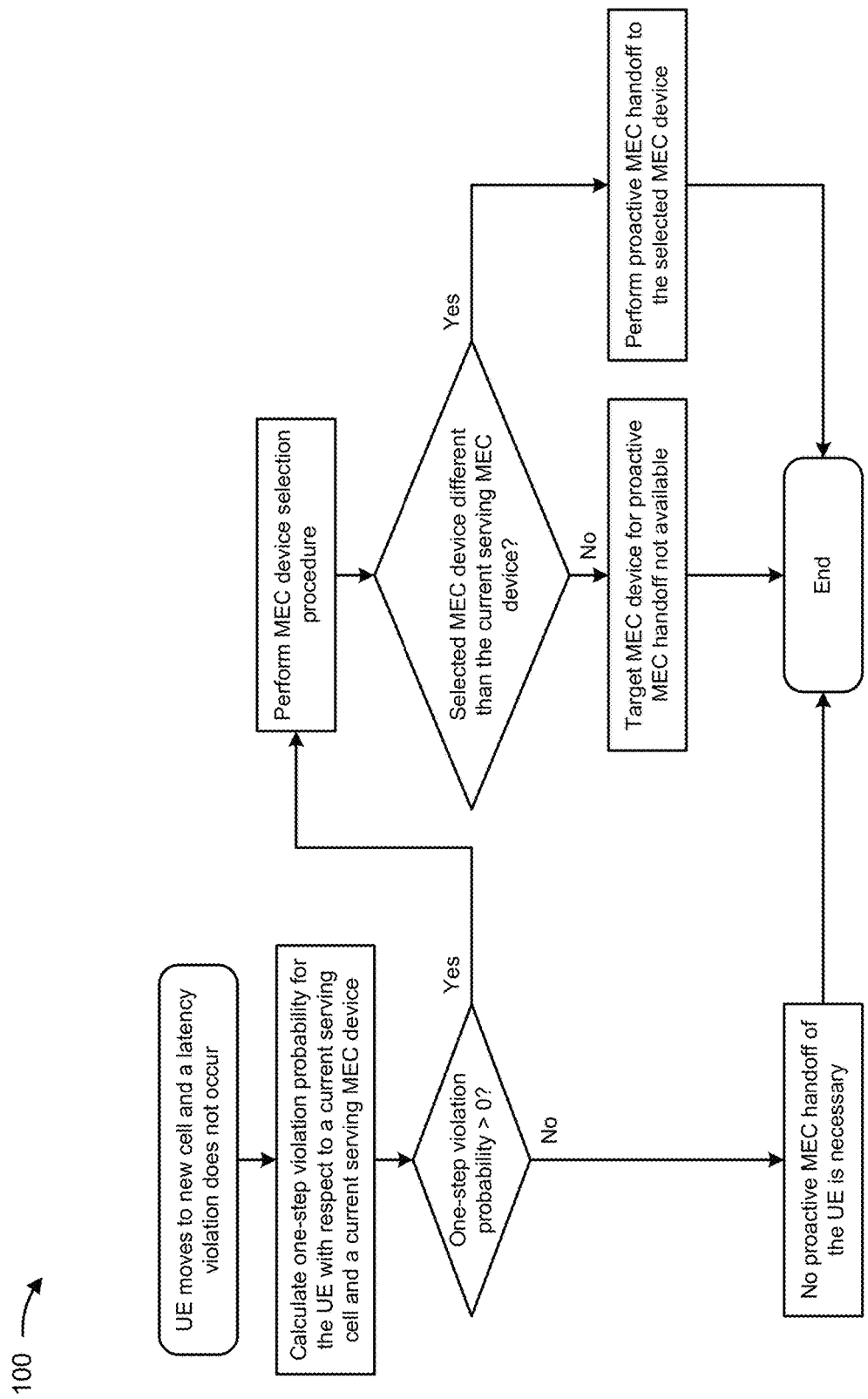

FIG. 1F is a flowchart of an example process for performing a MEC proactive handoff. In some implementations, the process of FIG. 1F may be performed by a device (e.g., the orchestration device). In some implementations, the process of FIG. 1F may be performed by another device or a group of devices separate from or including the device, such as a base station (e.g., base station 110) and/or a MEC device (MEC device 120). As shown in FIG. 1F, the process may include UE 105-1 moving to a new cell without a latency violation (as explained above). As shown in FIG. 1F, the process may include calculating a one-step violation probability for UE 105-1 with respect to a current serving cell and a current serving MEC device 120. The process may include determining whether the one-step violation is greater than zero. As shown in FIG. 1F, if the one-step violation is not greater than zero, the process may include determining that a MEC proactive handoff is not necessary.

As shown in FIG. 1F, if the one-step violation is greater than zero, the process may include performing a MEC device selection procedure (as described above). As shown in FIG. 1F, the process may include determining whether the selected MEC device 120 is different than the current serving MEC device 120. If the selected MEC device 120 is different than the current serving MEC device 120, the process may include performing the MEC proactive handoff for the selected MEC device 120. Alternatively, the process may include determining that the MEC proactive handoff is not available (e.g., the MEC proactive handoff is not to be performed).

Although FIG. 1F shows example blocks of a process for performing a proactive handoff, in some implementations, the process of FIG. 1F may include additional blocks, fewer blocks, different blocks, or differently arranged blocks than those depicted in FIG. 1F. Additionally, or alternatively, two or more of the blocks of the process of FIG. 1F may be performed in parallel.

Figure 1G:
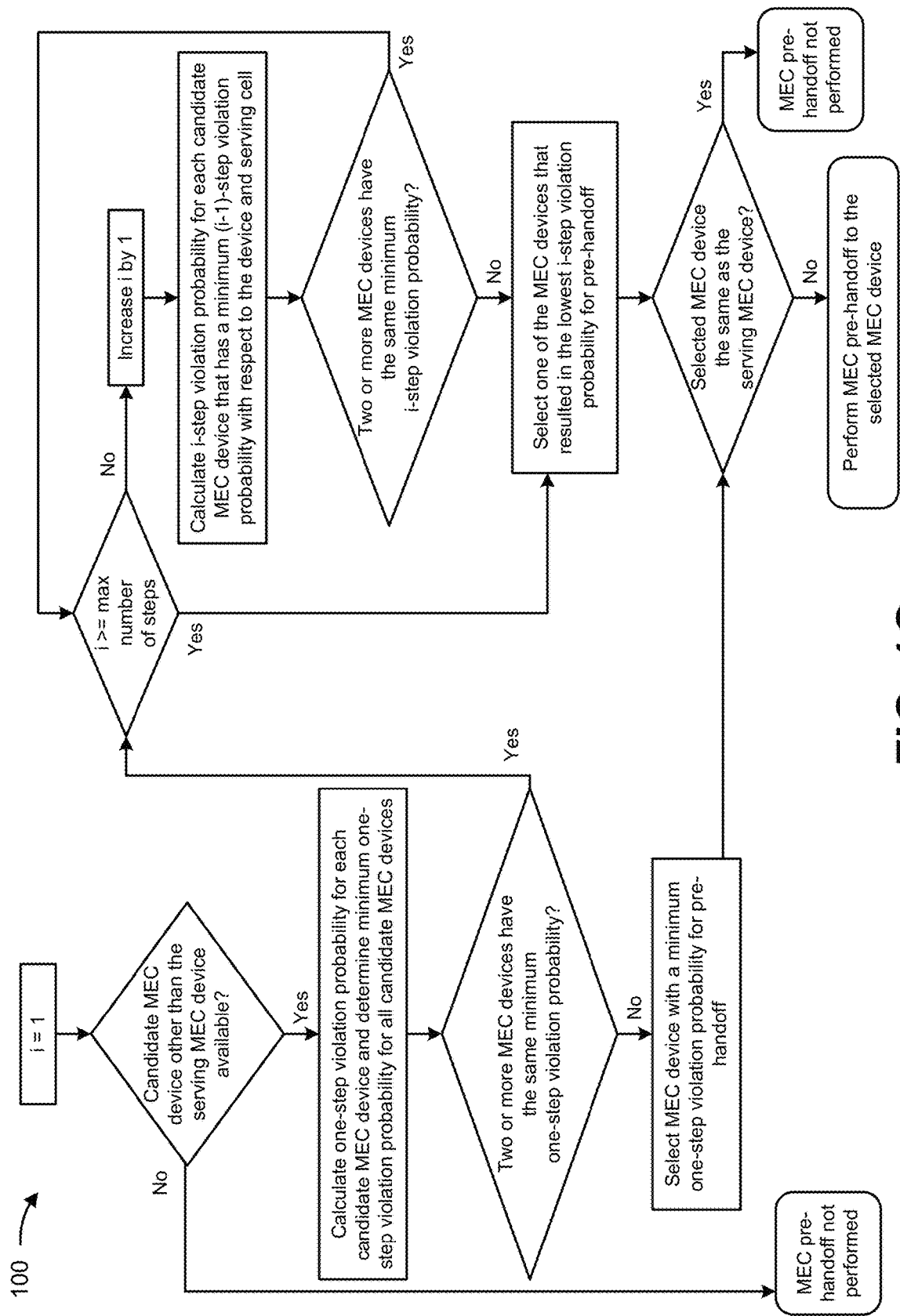

FIG. 1G is a flowchart of an example process for performing an MEC pre-handoff. In some implementations, the process of FIG. 1G may be performed by a device (e.g., the orchestration device). In some implementations, the process of FIG. 1G may be performed by another device or a group of devices separate from or including the device, such as a base station (e.g., base station 110) and/or a MEC device (MEC device 120). As shown in FIG. 1G, the process may include determining whether a candidate MEC device 120 other than the serving MEC device 120 is available. A candidate MEC device 120 may refer to a MEC device 120 that is accessible to UE 105-1 and that has sufficient computing resources to perform computations (e.g., associated with an application executed by the device (e.g., UE 105-1)). As shown in FIG. 1G, if no candidate MEC device 120 is available, the process may include determining that a MEC pre-handoff is not to be performed. Alternatively, the process may include calculating a one-step violation probability for each candidate MEC device 120 and determining a minimum one-step violation probability for all the candidate MEC device 120 (e.g., determining a candidate MEC device 120 with a lowest one-step violation probability). As shown in FIG. 1G, if two or more candidate MEC devices 120 do not have the same minimum one-step violation probability, the process may include selecting the candidate MEC device 120 with a minimum (or lowest) one-step violation probability for a MEC pre-handoff.

As shown in FIG. 1G, the process may include determining whether the selected candidate MEC device 120 is the serving MEC device 120. As shown in FIG. 1G, if the candidate MEC device 120 is the serving MEC device 120, the process may include determining that the MEC pre-handoff is not to be performed. Alternatively, the process may include performing the MEC pre-handoff to the selected MEC device.

As shown in FIG. 1G, if two or more candidate MEC devices 120 have the same minimum one-step violation probability, the process may include determining whether the step of the violation probability equals or exceeds a maximum number of steps of the violation probability (e.g., determine whether i≥a maximum number of steps). As shown in FIG. 1G, if the step of the violation probability does not equal or exceed the maximum number of steps of the violation probability, the process may include increasing the number of steps by 1 (e.g., in this example, increasing the one-step violation probability to a two-step violation probability) and calculating two-step violation probability for each candidate MEC device 120 with a minimum one-step violation probability with respect to the device (e.g., UE 105-1) and the serving cell. As shown in FIG. 1G, if two or more candidate MEC devices 120 have the same minimum two-step violation probability, the process may be iterated for a three-step violation probability, a four-step violation probability, and so on until the maximum number of steps has been performed. Otherwise, if two or more candidate MEC devices 120 do not have the same minimum two-step violation probability or if the step of the violation probability equals or exceeds the maximum number of steps of the violation probability, the process may include selecting one of the candidate MEC devices 120 with a lowest two-step (e.g., i-step) violation probability for a MEC pre-handoff.

As shown in FIG. 1G, the process may include determining whether the selected candidate MEC device 120 is the current serving MEC device 120. As shown in FIG. 1G, if the candidate MEC device 120 is the current serving MEC device 120, the process may include determining that the MEC pre-handoff is not to be performed. Alternatively, the process may include performing the MEC pre-handoff to the selected MEC device 120.

Although FIG. 1G shows example blocks of a process for performing a MEC pre-handoff, in some implementations, the process of FIG. 1G may include additional blocks, fewer blocks, different blocks, or differently arranged blocks than those depicted in FIG. 1G. Additionally, or alternatively, two or more of the blocks of the process of FIG. 1G may be performed in parallel.

Figure 1H:
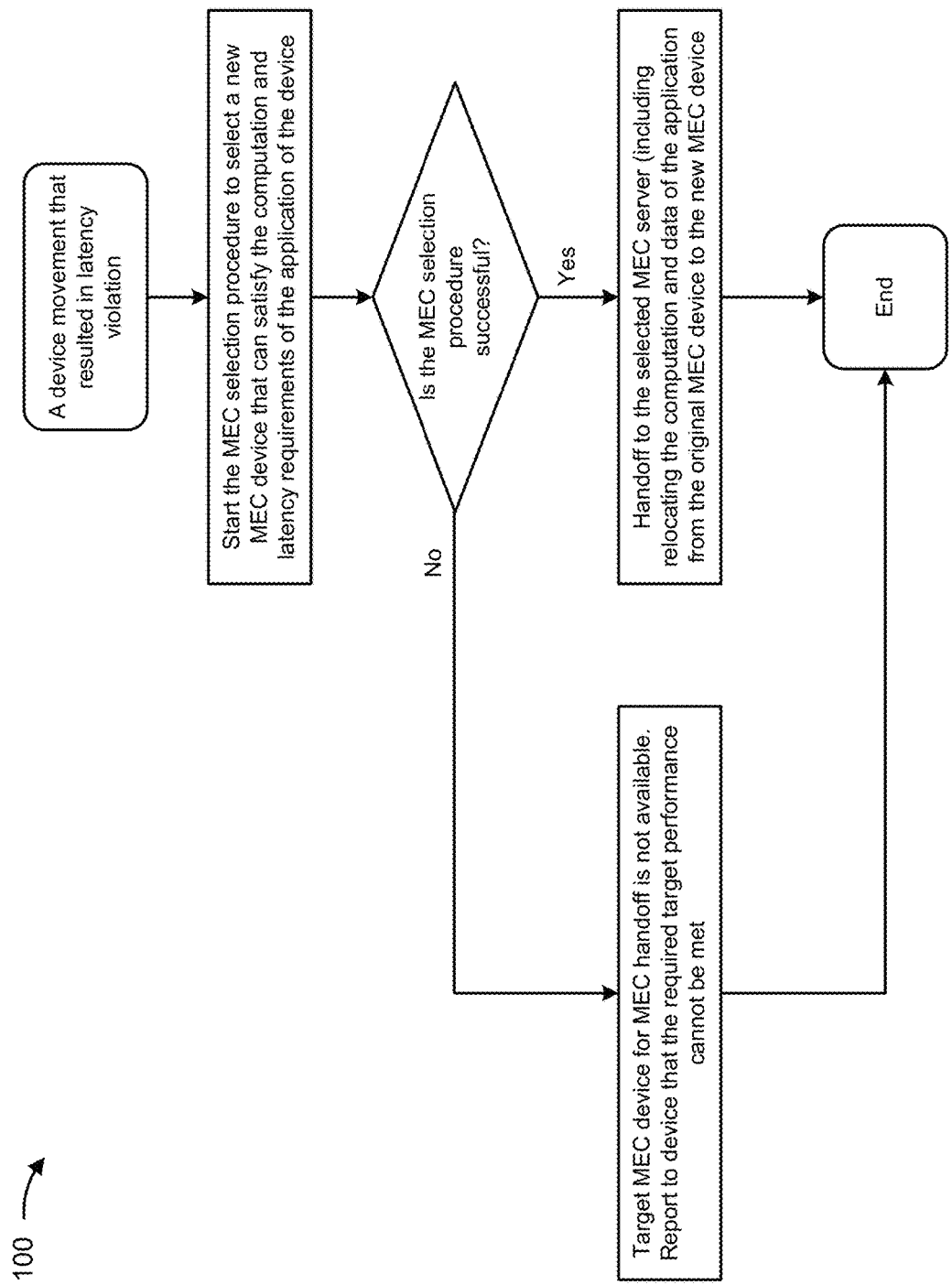

FIG. 1H is a flowchart of an example process for performing a MEC hard handoff. In some implementations, the process of FIG. 1H may be performed by a device (e.g., the orchestration device). In some implementations, the process of FIG. 1H may be performed by another device or a group of devices separate from or including the device, such as a base station (e.g., base station 110) and/or a MEC device (MEC device 120). As shown in FIG. 1H, assume that a movement of the device (e.g., UE 105-1) has resulted in a latency violation. As shown in FIG. 1H, the process may include starting a MEC selection procedure to select a new MEC device 120 that can satisfy the computation and latency requirements of the application of the device.

As shown in FIG. 1H, the process may include determining whether the MEC selection procedure was successful. As shown in FIG. 1H, if the MEC selection procedure is not successful, the process may include determining that a target MEC device 120 for a MEC handoff is not available. The process may include reporting, to the device, that the required target performance (e.g., the computation and latency requirements) cannot be met. As shown in FIG. 1H, if the MEC selection procedure is successful, the process may include performing a MEC handoff to the selected MEC device 120 (including relocating the computation and data of the application from the original (or current) MEC device 120 to the new MEC device 120.

Although FIG. 1H shows example blocks of a process for performing a MEC hard handoff, in some implementations, the process of FIG. 1H may include additional blocks, fewer blocks, different blocks, or differently arranged blocks than those depicted in FIG. 1H. Additionally, or alternatively, two or more of the blocks of the process of FIG. 1H may be performed in parallel.

As explained herein, a UE may take into consideration the mobility of the UE (e.g., one-step movement, two-step movement, and so on) when performing a MEC device selection procedure and a MEC relocation procedure. In some instances, the UE may perform a MEC proactive handoff that proactively relocates computations from a serving MEC device to a different MEC device after a movement of the UE (e.g., to a new cell or to a new base station) even if such movement does not result in a latency violation by the serving MEC device. The MEC proactive handoff may minimize the probability of a latency violation with respect to one or more subsequent movement of the UE.

By taking the mobility of the UE into consideration as explained herein, the UE may minimize degradation and loss of services when MEC device selection and MEC relocation procedures are performed. Thus, the UE may conserve computing resources, networking resources, and other resources that would have otherwise been consumed by configuring the UE to prevent degradation and/or temporary loss of services, configuring MEC devices to prevent degradation and/or temporary loss of services, configuring a cellular network to prevent degradation and/or temporary loss of services, among other examples.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
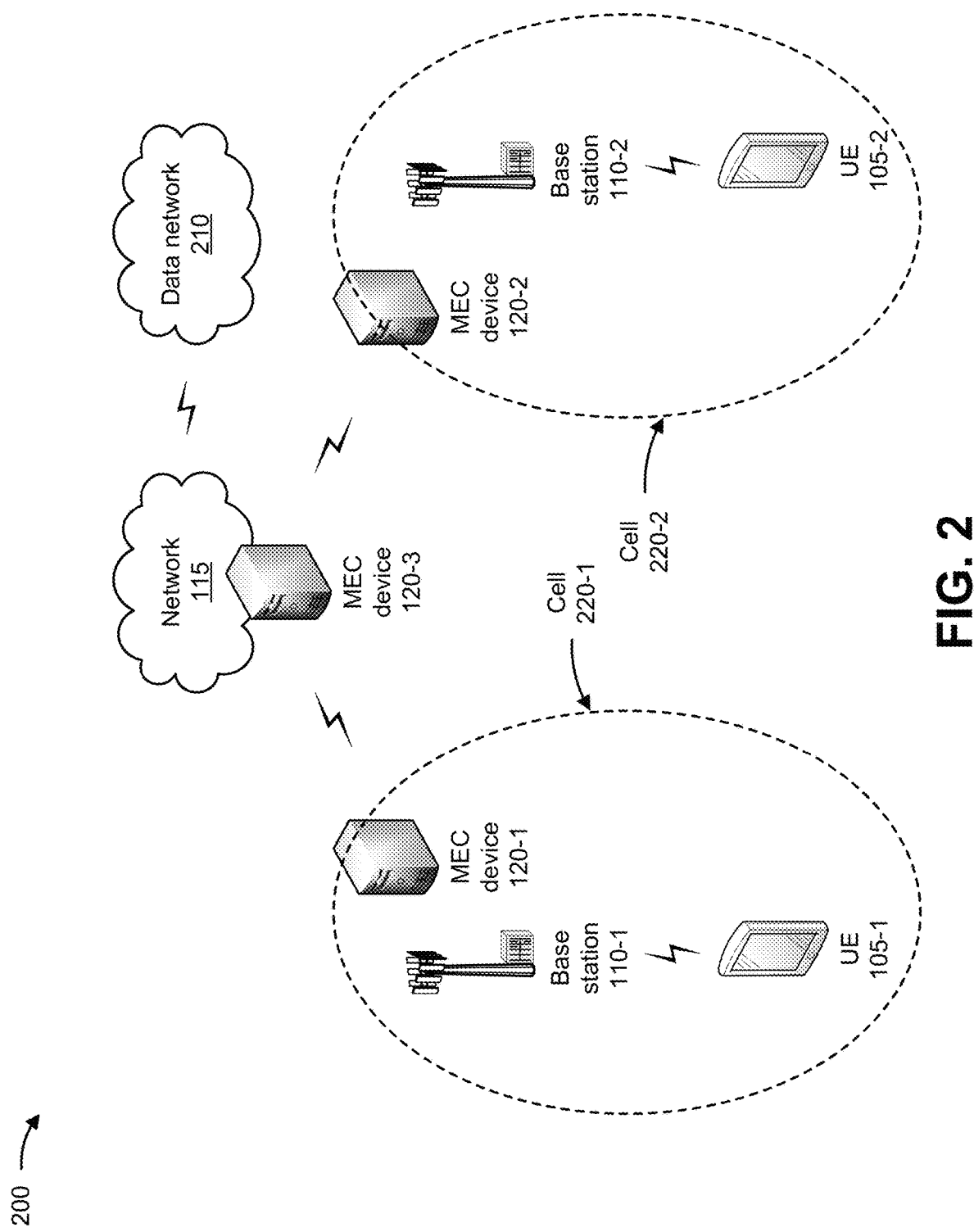
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include UEs 105, base stations 110, network 115, MEC devices 120, and/or data network 210. Devices and/or elements of environment 200 may interconnect via wired connections and/or wireless connections.

UE 105 includes one or more devices capable of receiving, generating, storing, processing, and/or providing information, as described elsewhere herein. UE 105 may include a communication device. For example, UE 105 may include a wireless communication device, a mobile phone, a laptop computer, a tablet computer, a gaming console, a set-top box, a wearable communication device (e.g., a smart wristwatch, a pair of smart eyeglasses, a head mounted display, or a virtual reality headset), or a similar type of device.

Base station 110 includes one or more devices capable of transferring traffic, such as audio, video, text, and/or other traffic, destined for and/or received from UE 105. For example, base station 110 may include an eNB associated with an LTE network that receives traffic from and/or sends traffic to a core network, a gNB associated with a RAN of a 5G network, a base transceiver station, a radio base station, a base station subsystem, a cellular site, a cellular tower, an access point, a transmit receive point (TRP), a radio access node, a macrocell base station, a microcell base station, a picocell base station, a femtocell base station, and/or another network entity capable of supporting wireless communication.

Network 115 may include a core network or a RAN that includes one or more base stations 110 that take the form of eNBs, gNBs, among other examples, via which a user device (e.g., a mobile phone, a laptop computer, a tablet computer, a desktop computer, among other examples) communicates with a core network. Network 115 may include one or more wired and/or wireless networks. For example, network 115 may include a cellular network (e.g., a 5G network, an LTE network, a 3G network, a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, among other examples, and/or a combination of these or other types of networks.

MEC device 120 includes one or more devices capable of receiving, generating, storing, processing, providing, and/or routing information, as described elsewhere herein. MEC device 120 may include a communication device and/or a computing device. For example, MEC device 120 may include a device, such as an application device, a client device, a web device, a database device, a host device, a proxy device, a virtual device (e.g., executing on computing hardware), or a device in a cloud computing system. In some implementations, MEC device 120 includes computing hardware used in a cloud computing environment.

Data network 210 includes one or more wired and/or wireless networks. For example, data network 210 may include a LAN, a WAN, a MAN, a telephone network (e.g., the PSTN), a private network, an ad hoc network, an intranet, the Internet, a fiber optic-based network, among other examples, and/or a combination of these or other types of networks.

As shown in FIG. 2, UE 105-1 may be connected to base station 110-1. UE 105-1 may receive and transmit data via cell 220-1 of base station 110-1. MEC 120-1 may be associated with cell 220-1 and may support computing requirements of applications executed by UE 105-1. UE 105-2 may be connected to the base station 110-2. UE 105-2 may receive and transmit data via cell 220-2 of base station 110-2. MEC 120-2 may be associated with cell 220-2 and may support computing requirements of applications executed by UE 105-2.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
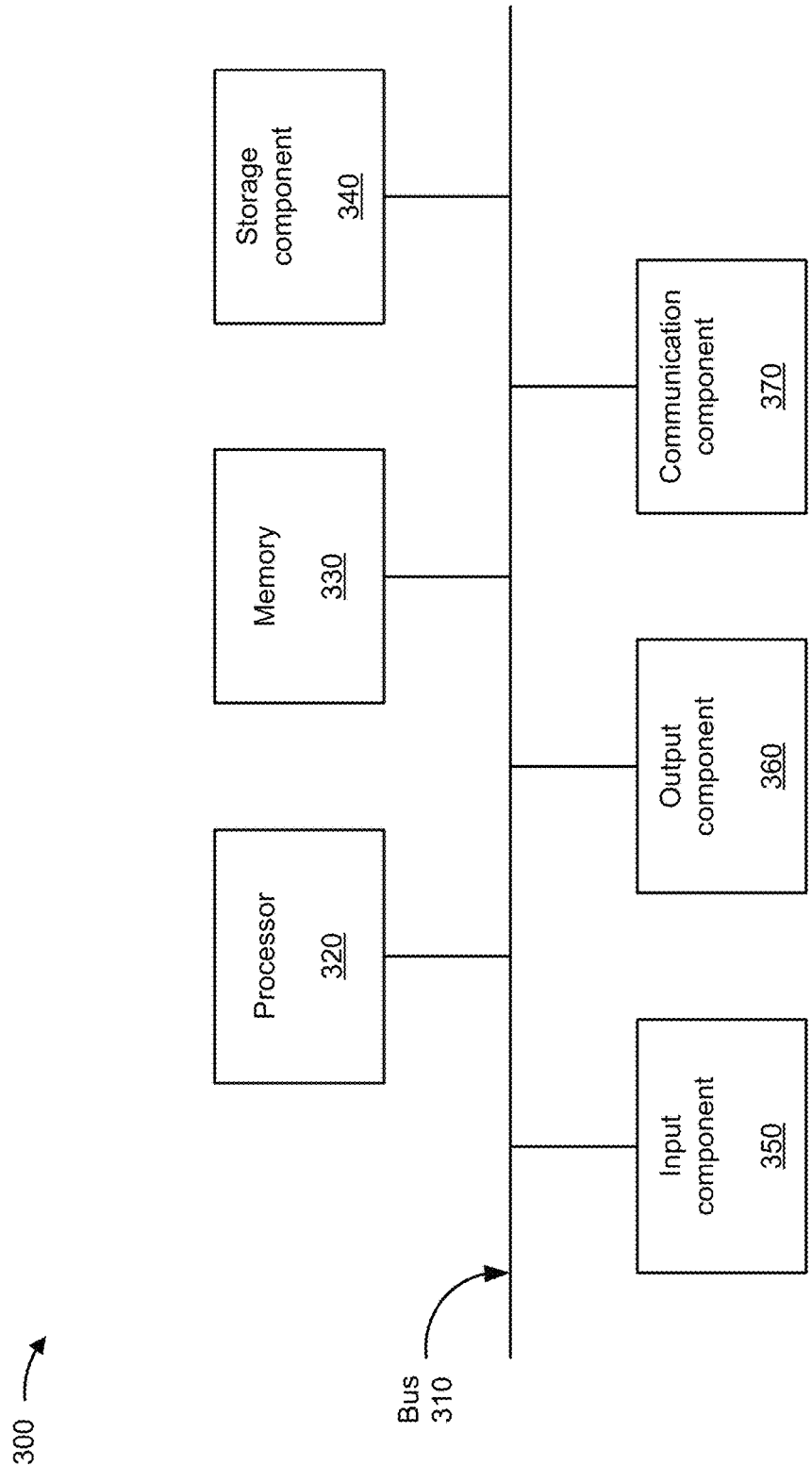
FIG. 3 is a diagram of example components of one or more devices of FIG. 2.

FIG. 3 is a diagram of example components of one or more devices of FIG. 2. The one or more devices may include a device 300, which may correspond to UE 105, base station 110, and/or MEC device 120. In some implementations, UE 105, base station 110, and/or MEC device 120 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random-access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid-state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hard-wired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 for providing mobility aware MEC device selection and relocation. In some implementations, one or more process blocks of FIG. 4 may be performed by a device (e.g., UE 105). In some implementations, one or more process blocks of FIG. 4 may be performed by another device or a group of devices separate from or including the device, such as a base station (e.g., base station 110) and/or a MEC device (MEC device 120). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include determining a latency requirement of the user equipment (block 410). For example, the user equipment may determine a latency requirement of the user equipment, as described above. In some implementations, the latency requirement is associated with computing resources to be used to support the application being executed by the user equipment.

As further shown in FIG. 4, process 400 may include determining a first set of latencies between the user equipment and a first multi-access edge computing device (block 420). For example, the user equipment may determine a first set of latencies between the user equipment and a first multi-access edge computing device, as described above.

In some implementations, determining the first set of latencies between the user equipment and the first multi-access edge computing device includes determining a plurality of latencies between the user equipment and the first multi-access edge computing device based on the user equipment being located in a corresponding plurality of cells of a network. The plurality of latencies corresponds to the first set of latencies.

As further shown in FIG. 4, process 400 may include determining a second set of latencies between the user equipment and a second multi-access edge computing device (block 430). For example, the user equipment may determine a second set of latencies between the user equipment and a second multi-access edge computing device, as described above.

In some implementations, determining the second set of latencies between the user equipment and the second multi-access edge computing device includes determining a plurality of latencies between the user equipment and the second multi-access edge computing device based on the user equipment being located in a corresponding plurality of cells of a network. The plurality of latencies corresponds to the second set of latencies.

In some implementations, the first multi-access edge computing device is a serving multi-access edge computing device for the user equipment. Determining the second set of latencies between the user equipment and the second multi-access edge computing device includes receiving, from the first multi-access edge computing device, information identifying a plurality of latencies between the user equipment and the second multi-access edge computing device based on the user equipment being located in a corresponding plurality of cells of a network; and determining the second set of latencies between the user equipment and the second multi-access edge computing device based on the information identifying the plurality of latencies.

As further shown in FIG. 4, process 400 may include calculating a first violation probability based on the latency requirement and the first set of latencies (block 440). For example, the user equipment may calculate a first violation probability based on the latency requirement and the first set of latencies, as described above.

As further shown in FIG. 4, process 400 may include calculating a second violation probability based on the latency requirement and the second set of latencies (block 450). For example, the user equipment may calculate a second violation probability based on the latency requirement and the second set of latencies, as described above.

As further shown in FIG. 4, process 400 may include identifying the first multi-access edge computing device or the second multi-access edge computing device based on the first violation probability and the second violation probability (block 460). For example, the user equipment may identify the first multi-access edge computing device or the second multi-access edge computing device based on the first violation probability and the second violation probability, as described above.

In some implementations, identifying the first multi-access edge computing device or the second multi-access edge computing device includes determining that the second violation probability is less than the first violation probability, and identifying the second multi-access edge computing device based on determining that the second violation probability is less than the first violation probability.

As further shown in FIG. 4, process 400 may include selectively initiating a MEC handoff of the user equipment to the first multi-access edge computing device or the second multi-access edge computing device based on identifying the first multi-access edge computing device or the second multi-access edge computing device (block 470). For example, the user equipment may selectively initiate a MEC handoff of the user equipment to the first multi-access edge computing device or the second multi-access edge computing device based on identifying the first multi-access edge computing device or the second multi-access edge computing device, as described above.

In some implementations, process 400 includes one of performing a MEC proactive handoff to the first multi-access edge computing device or the second multi-access edge computing device, wherein the MEC proactive handoff is a particular MEC handoff that is initiated even when a current serving multi-access edge computing device provides a particular latency performance; or performing a MEC pre-handoff to the first multi-access edge computing device or the second multi-access edge computing device, wherein the MEC pre-handoff prepares the first multi-access edge computing device or the second multi-access edge computing device to support the user equipment prior to the MEC handoff.

In some implementations, the first multi-access edge computing device is a serving multi-access edge computing device and process 400 includes determining that the first violation probability and the second violation probability are equivalent, and preventing a MEC handoff from the first multi-access edge computing device to the second multi-access edge computing device based on determining that the first violation probability and the second violation probability are equivalent.

In some implementations, process 400 includes determining a third set of latencies between the user equipment and the first multi-access edge computing device, determining a fourth set of latencies between the user equipment and the second multi-access edge computing device, calculating a third violation probability based on the latency requirement and the third set of latencies, calculating a fourth violation probability based on the latency requirement and the fourth set of latencies, identifying the first multi-access edge computing device or the second multi-access edge computing device based on the third violation probability and the fourth violation probability, and selectively initiating the MEC handoff of the user equipment to the first multi-access edge computing device or the second multi-access edge computing device based on identifying the first multi-access edge computing device or the second multi-access edge computing device.

In some implementations, process 400 includes one of performing a MEC proactive handoff to the first multi-access edge computing device or the second multi-access edge computing device, wherein the MEC proactive handoff is a particular MEC handoff that is initiated even when a current serving multi-access edge computing device of the user equipment provides a particular latency performance; or performing a MEC pre-handoff to the first multi-access edge computing device or the second multi-access edge computing device, wherein the MEC pre-handoff prepares the first multi-access edge computing device or the second multi-access edge computing device to support the user equipment prior to the MEC handoff.

In some implementations, the first multi-access edge computing device is a serving multi-access edge computing device and process 400 includes determining that the third violation probability and the fourth violation probability are equivalent, and preventing a MEC handoff from the first multi-access edge computing device to the second multi-access edge computing device based on determining that the third violation probability and the fourth violation probability are equivalent.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   determining, by a device, a latency requirement of a user equipment (UE);
   determining, by the device, a first set of latencies between the UE and a first multi-access edge computing (MEC) device;

determining, by the device, a second set of latencies between the UE and a second MEC device;

calculating, by the device, a first violation probability based on the latency requirement and the first set of latencies and a second violation probability based on the latency requirement and the second set of latencies;

identifying, by the device, the first MEC device or the second MEC device based on the first violation probability and the second violation probability; and selectively initiating, by the device, a MEC handoff of the UE to the first MEC device or the second MEC device based on identifying the first MEC device or the second MEC device.

2. The method of claim 1, further comprising one of:
performing a MEC proactive handoff to the first MEC device or the second MEC device,
  wherein the MEC proactive handoff is a particular MEC handoff that is initiated even when a current serving MEC device provides a particular latency performance; or
performing a MEC pre-handoff to the first MEC device or the second MEC device, wherein the MEC pre-handoff prepares the first MEC computing device or the second MEC device to support the user equipment prior to the MEC handoff.

3. The method of claim 1, wherein the first MEC device is a serving MEC device and the method further comprises:
determining that the first violation probability and the second violation probability are equivalent; and
preventing a MEC handoff from the first MEC device to the second MEC device based on determining that the first violation probability and the second violation probability are equivalent.

4. The method of claim 1, further comprising:
determining a third set of latencies between the UE and the first MEC device;
determining a fourth set of latencies between the UE and the second MEC device;
calculating a third violation probability based on the latency requirement and the third set of latencies;
calculating a fourth violation probability based on the latency requirement and the fourth set of latencies;
identifying the first MEC device or the second MEC device based on the third violation probability and the fourth violation probability; and
selectively initiating the MEC handoff of the UE to the first MEC device or the second MEC device based on identifying the first MEC device or the second MEC device.

5. The method of claim 4, wherein selectively initiating the MEC handoff of the UE to the first MEC device or the second MEC device based on identifying the first MEC device or the second MEC device based on the third violation probability and the fourth violation probability comprise:
performing a MEC proactive handoff to the first MEC device or the second MEC device,
  wherein the MEC proactive handoff is a particular MEC handoff that is initiated even when a current serving MEC device of the UE provides a particular latency performance; or
performing a MEC pre-handoff to the first MEC device or the second MEC device,
  wherein the MEC pre-handoff prepares the first MEC device or the second MEC device to support the UE prior to the MEC handoff.

6. The method of claim 4, wherein the first MEC device is a serving MEC device and the method further comprises:
determining that the third violation probability and the fourth violation probability are equivalent; and
preventing a MEC handoff from the first MEC device to the second MEC device based on determining that the third violation probability and the fourth violation probability are equivalent.

7. The method of claim 1, wherein the first violation probability identifies a probability that the first MEC device will not be able to meet the latency requirement if the UE moves from a serving cell to a neighbor cell;
wherein the second violation probability identifies a probability that the second MEC device will not be able to meet the latency requirement if the UE moves from the serving cell to the neighbor cell; and
wherein identifying the first MEC device or the second MEC device comprises:
determining that the second violation probability is less than the first violation probability; and
identifying the second MEC device based on determining that the second violation probability is less than the first violation probability.

8. A device, comprising:
one or more processors configured to:
execute an application;
determine a latency requirement based on the application;
determine a first set of latencies between a user equipment and a first multi-access edge computing device (MEC);
determine a second set of latencies between the user equipment and a second MEC;
calculate a first violation probability based on the latency requirement and the first set of latencies and a second violation probability based on the latency requirement and the second set of latencies;
identify the first MEC or the second MEC based on the first violation probability and the second violation probability; and
selectively initiate a MEC handoff of the user equipment to the first MEC or the second MEC based on identifying the first MEC or the second MEC.

9. The device of claim 8, wherein the first violation probability identifies a probability that the first MEC device will not be able to meet the latency requirement if the user equipment moves from a serving cell to a neighbor cell;
wherein the second violation probability identifies a probability that the second MEC device will not be able to meet the latency requirement if the user equipment moves from the serving cell to the neighbor; and
wherein the one or more processors, when identifying the first MEC or the second MEC, are configured to:
determine that the first violation probability is less than the second violation probability; and
identify the first MEC based on determining that the first violation probability is less than the second violation probability.

10. The device of claim 8, wherein the one or more processors are further configured to one or more of:
cause computations of the user equipment to be provided to the first MEC or the second MEC; or
cause an application and data, of the user equipment, to be provided to the first MEC or the second MEC.

11. The device of claim 8, wherein the latency requirement is associated with computing resources to be used to support the application being executed by the user equipment.

12. The device of claim 8, wherein the one or more processors, when determining the first set of latencies between the user equipment and the first MEC, are configured to:
   determine a plurality of latencies between the user equipment and the first MEC based on the user equipment being located in a corresponding plurality of cells of a network,
      wherein the plurality of latencies corresponds to the first set of latencies.

13. The device of claim 8, wherein the one or more processors, when determining the second set of latencies between the user equipment and the second MEC, are configured to:
   determine a plurality of latencies between the user equipment and the second MEC based on the user equipment being located in a corresponding plurality of cells of a network,
      wherein the plurality of latencies corresponds to the second set of latencies.

14. The device of claim 8, wherein the first MEC is a serving MEC for the user equipment and wherein the one or more processors, when determining the second set of latencies between the user equipment and the second MEC, are configured to:
   receive, from the first MEC, information identifying a plurality of latencies between the user equipment and the second MEC based on the user equipment being located in a corresponding plurality of cells of a network; and
   determine the second set of latencies between the user equipment and the second MEC based on the information identifying the plurality of latencies.

15. A non-transitory computer-readable medium storing a set of instructions, the set of instructions comprising:
   one or more instructions that, when executed by one or more processors of a device, cause the device to:
      determine a latency requirement of a user equipment,
         wherein the latency requirement is associated with computing resources to be used to support an application being executed by the user equipment;
      determine a first set of latencies between the user equipment and a first multi-access edge computing device (MEC);
      determine a second set of latencies between the user equipment and a second MEC;
      calculate a first violation probability based on the latency requirement and the first set of latencies and a second violation probability based on the latency requirement and the second set of latencies;
      identify the first MEC or the second MEC based on the first violation probability and the second violation probability; and
      selectively initiate a MEC handoff of the user equipment to the first MEC or the second MEC based on identifying the first MEC or the second MEC.

16. The non-transitory computer-readable medium of claim 15, wherein the one or more instructions further cause the device to one or more of:
   perform a MEC proactive handoff to the first MEC or the second MEC,
      wherein the MEC proactive handoff is a particular MEC handoff that is initiated even when a current serving MEC of the user equipment provides a particular latency performance; or
   perform a MEC pre-handoff to the first MEC or the second MEC,
      wherein the MEC pre-handoff prepares the first MEC or the second MEC to support the user equipment prior to the MEC handoff.

17. The non-transitory computer-readable medium of claim 15, wherein the first violation probability identifies a probability that the first MEC device will not be able to meet the latency requirement if the UE moves from a serving cell to a neighbor cell;
   wherein the second violation probability identifies a probability that the second MEC device will not be able to meet the latency requirement if the UE moves from the serving cell to the neighbor; and
   wherein the one or more instructions further cause the device to:
      determine that the first violation probability and the second violation probability are equivalent; and
      prevent a MEC handoff from the first MEC to the second MEC based on determining that the first violation probability and the second violation probability are equivalent.

18. The non-transitory computer-readable medium of claim 15, wherein the one or more instructions further cause the device to:
   determine a third set of latencies between the user equipment and the first MEC;
   determine a fourth set of latencies between the user equipment and the second MEC;
   calculate a third violation probability based on the latency requirement and the third set of latencies;
   calculate a fourth violation probability based on the latency requirement and the fourth set of latencies;
   identify the first MEC or the second MEC based on the third violation probability and the fourth violation probability; and
   selectively initiate the MEC handoff of the user equipment to the first MEC or the second MEC based on identifying the first MEC or the second MEC.

19. The non-transitory computer-readable medium of claim 15, wherein the one or more instructions further cause the device to one or more of:
   cause computations of the user equipment to be provided to the first MEC or the second MEC; or
   cause an application and data, of the user equipment, to be provided to the first MEC or the second MEC.

20. The non-transitory computer-readable medium of claim 15, wherein the one or more instructions, that cause the device to determine the first set of latencies between the user equipment and the first MEC, cause the user equipment to:
   determine a plurality of latencies between the user equipment and the first MEC based on the user equipment being located in a corresponding plurality of cells of a network,
      wherein the plurality of latencies corresponds to the first set of latencies.

* * * * *